United States Patent
Matsunaga et al.

[11] Patent Number: 5,962,789
[45] Date of Patent: Oct. 5, 1999

[54] SEMICONDUCTOR ACCELERATION SENSOR USING SEMICONDUCTOR MICROWORKING TECHNOLOGY

[75] Inventors: Tadao Matsunaga, Miyagi; Takashi Kunimi, Tokyo; Masahiro Nezu; Masatomo Mori, both of Saitama, all of Japan

[73] Assignee: Akebono Brake Industry Co., Ltd., Tokyo, Japan

[21] Appl. No.: 08/950,137

[22] Filed: Oct. 14, 1997

[30] Foreign Application Priority Data

Oct. 14, 1996 [JP] Japan .................................. 8-270496

[51] Int. Cl.$^6$ ..................................................... G01P 15/08
[52] U.S. Cl. ................................. 73/514.38; 73/514.36; 200/61.53
[58] Field of Search .................. 250/306; 73/514.18, 73/514.21, 514.23, 514.36, 514.38, 514.16, 514.17, 504.15; 200/61.45 R, 61.53

[56] References Cited

U.S. PATENT DOCUMENTS

| | | | |
|---|---|---|---|
| 5,596,194 | 1/1997 | Kubena | 250/306 |
| 5,744,717 | 4/1998 | Tanten | 73/514.18 |
| 5,756,895 | 5/1998 | Kubena | 73/504.15 |

FOREIGN PATENT DOCUMENTS 4-127574  11/1992  Japan .
4-136575  12/1992  Japan .

*Primary Examiner*—Christine K. Oda
*Attorney, Agent, or Firm*—Morgan, Lewis & Bockius LLP

[57] ABSTRACT

A semiconductor acceleration sensor comprising a rectangular semiconductor substrate on the moving electrode side and a rectangular semiconductor substrate on the fixed electrode side laminated on each other, the moving electrode side substrate being formed with a heavy weight and a thin cantilever, a moving electrode being provided on the heavy weight, a first electrostatic attraction electrode being provided on the cantilever, the fixed electrode side substrate being formed with a fixed electrode at a position opposed to the moving electrode and a second electrostatic attraction electrode at a position opposed to the electrostatic attraction electrode. The first and second electrostatic attraction electrodes are placed facing each other. A predetermined spacing is provided between the electrostatic attraction electrodes and a predetermined voltage is applied therebetween.

20 Claims, 5 Drawing Sheets

OFF

ON

SEMICONDUCTOR ACCELERATION SENSOR USING SEMICONDUCTOR MICROWORKING TECHNOLOGY

BACKGROUND OF THE INVENTION

1. Field of the Invention

The present invention relates to an acceleration sensor and in particular to an acceleration sensor having a switching mechanism using a semiconductor microworking technology.

2. Related Art

In recent years, acceleration sensors have been used as means for indirectly detecting an action force of impact, etc., without coming in direct contact with an object. The acceleration sensors cover various applications; it is desired that the acceleration sensor is compact and lightweight, does not require a mounting space on an object, and operates precisely and reliably.

As a predetermined acceleration detection sensor, a sensor using a conductive sphere displaced according to acceleration and connecting two contacts by the conductive sphere is disclosed in Japanese Utility Model Laid-Open Application Nos. Hei 4-136575 and 4-127574.

However, the mechanical acceleration switch connecting two contacts by a conductive sphere becomes large in the outside shape because of the structure, thus is slow in response speed and involves an accuracy problem. If such a mechanical acceleration switch is miniaturized, batch processing cannot be performed in the manufacturing process and the mechanical acceleration switch becomes expensive.

SUMMARY OF THE INVENTION

It is therefore an object of the invention to provide a miniaturized semiconductor acceleration sensor that can solve the problems of the mechanical acceleration sensor and can be manufactured in quantity at low costs.

It is another object of the invention to provide a semiconductor acceleration sensor which resolves the effect of an electrostatic attraction force between electrodes and performs stable and high-accuracy switching operation.

It is another object of the invention to enable adjustment of rated sensitivity in response to detected acceleration and detection of acceleration in two directions.

It is another object of the invention to enable mass manufacturing of a miniaturized, easy-to-handle acceleration detector at low costs by using the semiconductor microworking technology.

To the ends, according to the invention, there is provided, in a semiconductor acceleration sensor comprising a rectangular semiconductor substrate on the moving electrode side and a rectangular semiconductor substrate on the fixed electrode side laminated on each other, the moving electrode side substrate being formed with a heavy weight and a thin cantilever, a moving electrode being provided on the heavy weight, a first electrostatic attraction electrode being provided on the cantilever, the fixed electrode side substrate being formed with a fixed electrode at a position opposed to the moving electrode and a second electrostatic attraction electrode at a position opposed to the electrostatic attraction electrode, the improvement wherein the first and second electrostatic attraction electrodes are placed facing each other and wherein a predetermined spacing is provided between the electrostatic attraction electrodes and a predetermined voltage is applied therebetween.

According to another aspect of the present invention, in the semiconductor acceleration sensor, a sensor configuration consisting of the moving electrode, the electrostatic attraction electrode, the heavy weight, and the cantilever of the moving electrode side substrate is placed on both faces of the moving electrode side substrate and the moving electrode side substrate is sandwiched between the two fixed electrode side substrates, whereby acceleration can be detected in two directions.

In addition, in the semiconductor acceleration sensor according to the present invention, a semiconductor element connected to either of the moving electrode and the fixed electrode is built in the substrate formed with the moving electrode or the fixed electrode. The semiconductor element is a Zener diode for damping surge current. In the invention, the semiconductor element is a load drive transistor.

Further, in the semiconductor acceleration sensor of the invention, a gap between the heavy weight, the cantilever, and the first electrostatic attraction electrode and the second electrostatic attraction electrode is provided by a photo-etching process.

Still further, in the semiconductor acceleration sensor of the invention, the fixed electrode, the moving electrode, and the electrostatic attraction electrodes are provided by doping with impurities or by evaporating a conductive metal such as gold or aluminum.

DESCRIPTION OF THE PREFERRED EMBODIMENTS

Figure 1:
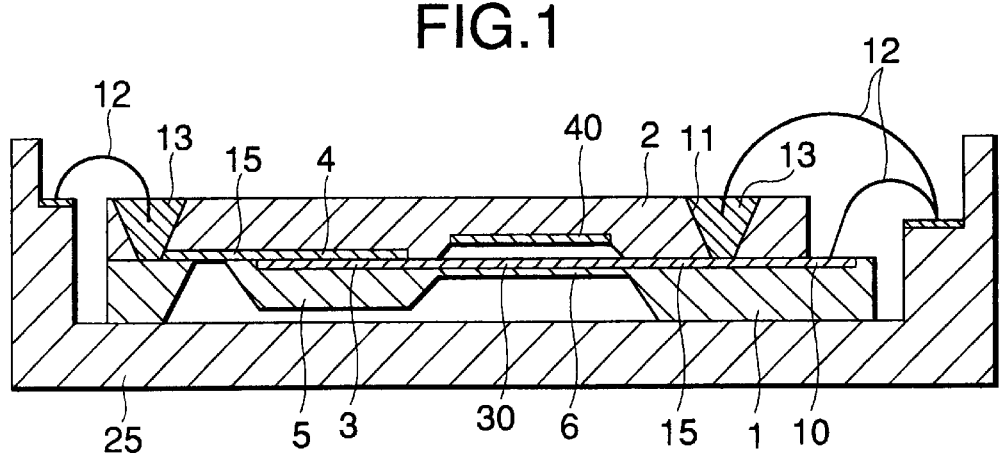
FIG. 1 is a sectional view to show a semiconductor acceleration sensor structure according to the invention.

FIG. 1 shows an outline of the structure of an acceleration sensor according to the invention.

The acceleration sensor comprises a semiconductor substrate 2 laminated on a semiconductor substrate 1.

For example, the semiconductor substrate 1 made of silicon is formed on a rear face with a heavy weight 5 and a cantilever 6 with one separated from the substrate 1 and the other thinned by a photo-etching process.

A moving electrode 3 is formed on the top face of the heavy weight on the top of the semiconductor substrate 1, an electrostatic attraction electrode 30 independent of the moving electrode 3 and a lead 15 of the moving electrode 3 are formed on the top face of the cantilever 6, and lead electrodes 15 and bonding pads 10 of the moving electrode 3 and the electrostatic attraction electrode 30 are formed on the substrate, for example, by doping with impurities or evaporating a metal.

The heavy weight 5 is separated on one end side from the substrate and is formed on the other end side with the thin cantilever 6 for supporting the heavy weight 5.

The silicon substrate 2 is formed on the rear face with a flat recess of a predetermined depth.

Further, the silicon substrate 2 is formed on the rear face with a fixed electrode 4 at a position facing the moving electrode 3, is formed on the bottom face of the recess with an electrostatic attraction electrode 40 at a position facing the electrostatic attraction electrode 30, and is formed with electrode leads 15 by doping with impurities or evaporating a metal as with the substrate 1.

Veer holes 11 made in the proximity of the end of the substrate 2 are filled with a conductive resin 13 of a conductive epoxy resin, etc., and the leads 15 are connected to external wiring via bonding wires 12.

The electrostatic attraction electrode 40 of the substrate 2 is formed in the recess as shown in the figure. The depth of the recess is adjusted, thereby forming a predetermined spacing between the electrostatic attraction electrode 40 and the electrostatic attraction electrode 30 on the moving electrode 3 side opposed to the electrostatic attraction electrode 40.

The substrates 1 and 2 thus formed are superposed on each other and joined so that the electrodes are opposed to each other. The substrates 1 and 2 are housed in a package 25 made of ceramic, etc., and are connected to external wiring via the bonding wires 12 and the conductive resins 13.

Figure 2A:
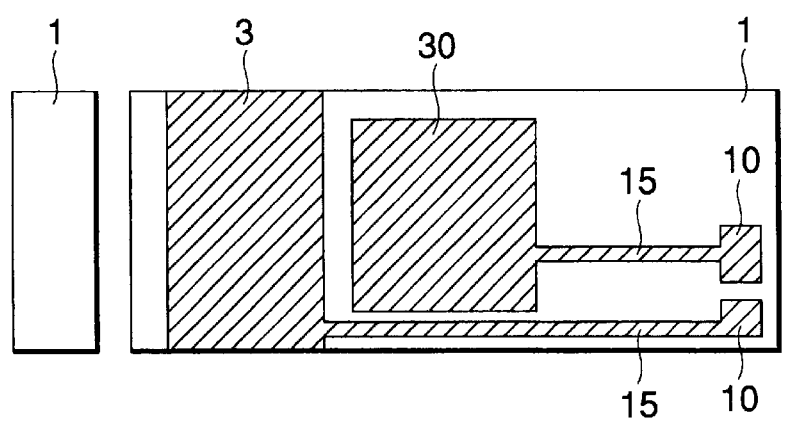
FIGS. 2A and 2B are plan views of substrates 1 and 2, respectively, of the acceleration sensor shown in FIG. 1.
Figure 2B:
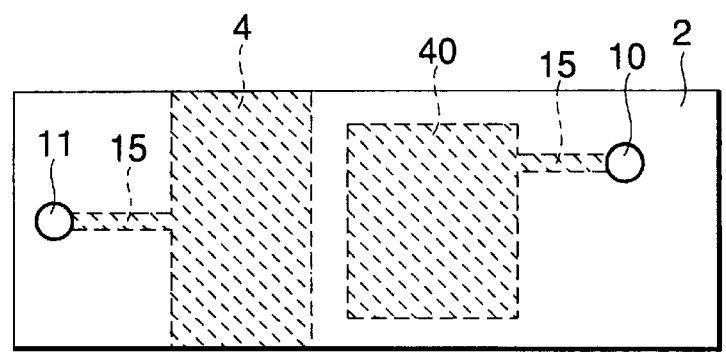

FIGS. 2A and 2B are plan views of the substrates 1 and 2, respectively. FIG. 2A shows the plane of the substrate 1 and FIG. 2B shows the plane of the substrate 2. Further, in FIG. 2B, an electrode pattern on the rear face of the substrate 2 is denoted by broken lines.

The moving electrode 3 and the moving electrode 4 are of almost the same dimensions and are in overlapped relation at the same vertical position. Likewise, the electrostatic attraction electrode 30 on the moving electrode side and the electrostatic attraction electrode 40 on the fixed electrode side also have almost the same dimensions and face each other with a space between in overlapped relation.

Figure 3:
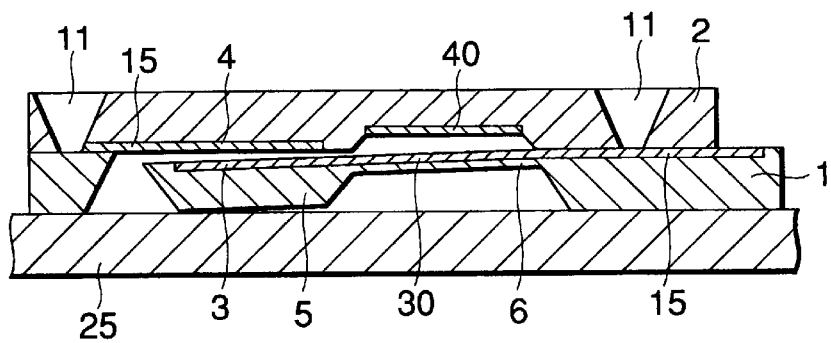
FIG. 3 is a sectional view to explain the operation state of the acceleration sensor according to the invention.

FIG. 3 shows the operation state of the acceleration sensor. In the figure, an electrostatic attraction voltage is applied between the electrostatic attraction electrodes 30 and 40 and the electrostatic attraction electrodes attract each other, whereby the moving electrode 3 is pressed against the fixed electrode 4 under the action and the detection circuit is closed.

Now, if upward acceleration G acts on the acceleration sensor, the heavy weight 5, which is thicker than other parts and has a large mass, exerts an inertial force relatively toward the bottom as shown in FIG. 3 on the cantilever 6 and the thin cantilever 6 attempts to warp downward.

However, if the acceleration is less than a predetermined magnitude, the warp in the cantilever 6 is limited by the electrostatic attraction force between the electrostatic attraction electrodes and the moving electrode 3 remains in contact with the fixed electrode 4.

Upon reception of a force caused by predetermined or more acceleration, the moving electrode 3 leaves the fixed electrode 4 against the electrostatic attraction force between the electrostatic attraction electrodes and the circuit is opened as the switching operation.

At this time, assuming that the mass of the heavy weight 5 is m and that the acceleration is G, inertial force Fs produced by the heavy weight 5 acting on the cantilever 6 is represented by expression (1) shown below. Assuming that the electrode area is S, that the electrode-to-electrode distance is X, that the interelectrode voltage is Vdd, and that the interelectrode permittivity is $\epsilon$, attraction force Fe acting between the electrostatic attraction electrodes is represented by the following expression (2):

$$Fs = m \cdot G \qquad (1)$$

$$Fe = \epsilon \cdot S \cdot Vdd^2 / 2X^2 \qquad (2)$$

Thus, the attraction force Fe acting between the electrostatic attraction electrodes is inversely proportional to the square of the electrode-to-electrode distance X, as shown in expression (2). Therefore, the acceleration G exceeds the predetermined value and Fs becomes greater than Fe. The moving electrode once leaving the fixed electrode because of the acceleration equivalent to the rated sensitivity does not again close the circuit under an equal action force, preventing occurrence of chattering in the vicinity of the rated sensitivity.

The voltage applied to the electrostatic attraction electrodes is changed, whereby the attraction force between the electrodes can be changed and the balance between the action of the inertial force caused by the acceleration and the electrostatic attraction force can be changed for adjusting the rated sensitivity at which the acceleration sensor performs the switching operation.

Figure 4A:
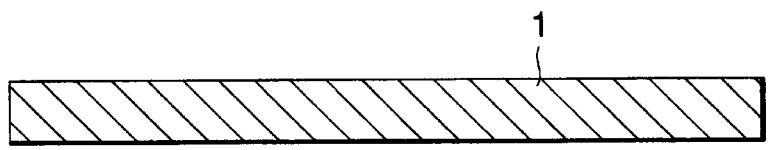
FIGS. 4A, 4B and 4C are illustrations of a manufacturing process of the the substrate 1 shown in FIG. 1 of the acceleration sensor according to the invention.
Figure 4B:
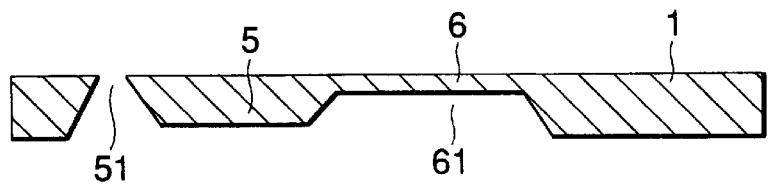

A manufacturing process of the acceleration sensor according to the invention will be discussed with FIGS. 4–7. The left part of the heavy weight 5 is separated from the silicon substrate 1 provided in FIG. 4A and the right cantilever 6 is etched to form a thin part 61 and a cut part 51 by a photo-etching process, forming the heavy weight 5 with one end separated and the cantilever 6 as shown in FIG. 4B. The etching amount is adjusted, whereby the thickness of the cantilever 6 can be adjusted for changing the acceleration magnitude for switching off. Likewise, the thickness and dimensions of the heavy weight 5 can also be formed by the etching process.

Figure 4C:
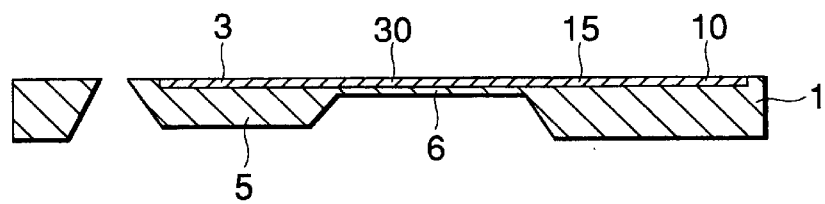

Next, the top face of the substrate 1 is doped with impurities of P+, etc., according to a photo-etching process pattern or gold (Au), aluminum (Al), etc., is evaporated as patterning, thereby forming the moving electrode 3, the electrostatic attraction electrode 30, the lead 15, and the bonding pad 10 as shown in FIG. 4C.

Figure 5A:
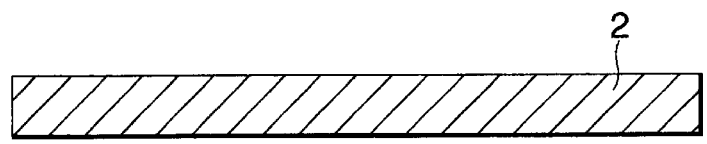
FIGS. 5A, 5B and 5C are illustrations of a manufacturing process of the the substrate 2 shown in FIG. 1 of the acceleration sensor according to the invention.
Figure 5B:
Figure 5C:
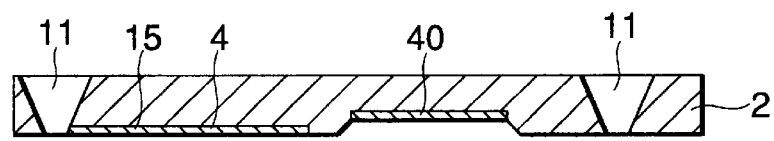

The silicon substrate 2 provided in FIG. 5A is formed with a recess defining the spacing between the electrostatic attraction electrodes by a photo-etching process and veer holes 11 are made in the vicinity of the substrate end as illustrated in FIG. 5B.

Next, the rear face of the substrate 2 is doped with impurities of P+, etc., according to a photo-etching process pattern or a metal such as Au or Al is evaporated as patterning, thereby forming the fixed electrode 4, the electrostatic attraction electrode 40, and the lead 15.

Figure 6:
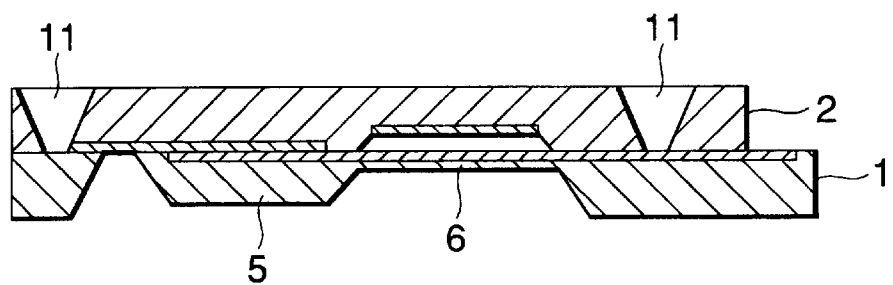
FIG. 6 is an illustration of the manufacturing process of the acceleration sensor according to the invention (joining substrates 1 and 2)
Figure 7:
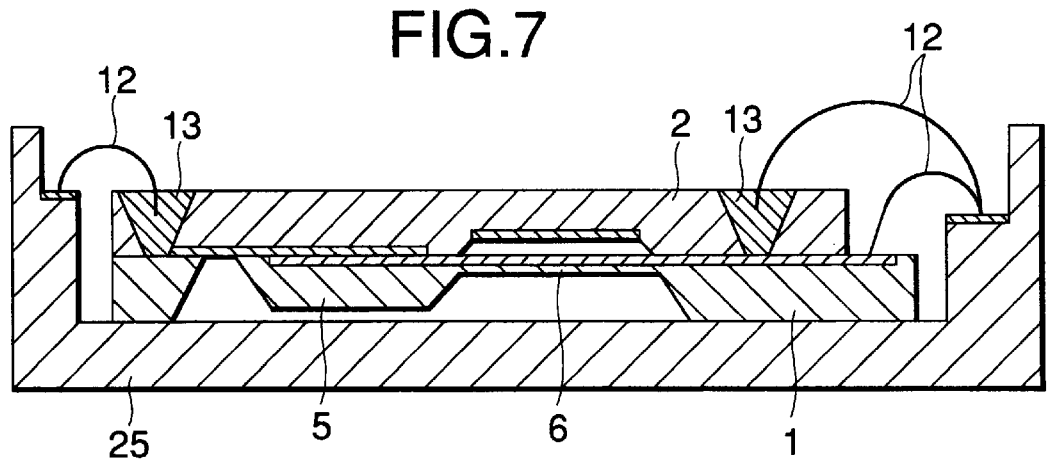
FIG. 7 is an illustration of the manufacturing process of the acceleration sensor according to the invention (packaging)

Next, in the step shown in FIG. 6, the substrates 1 and 2 are superposed and the portions in the proximity of both ends are joined by anode joining, etc. The steps usually are executed for the silicon substrates 1 and 2 in wafer units.

The substrates 1 and 2 thus formed are separated into substrates in chip units by dicing. Next, at step shown in FIG. 7, each chip is housed in a package 25 made of ceramic, etc., is fixed by die bonding, and is connected to external wiring by bonding wires 12, etc., then is covered with a lid, etc., (not shown) for sealing. The packaging step is now complete.

Figure 8:
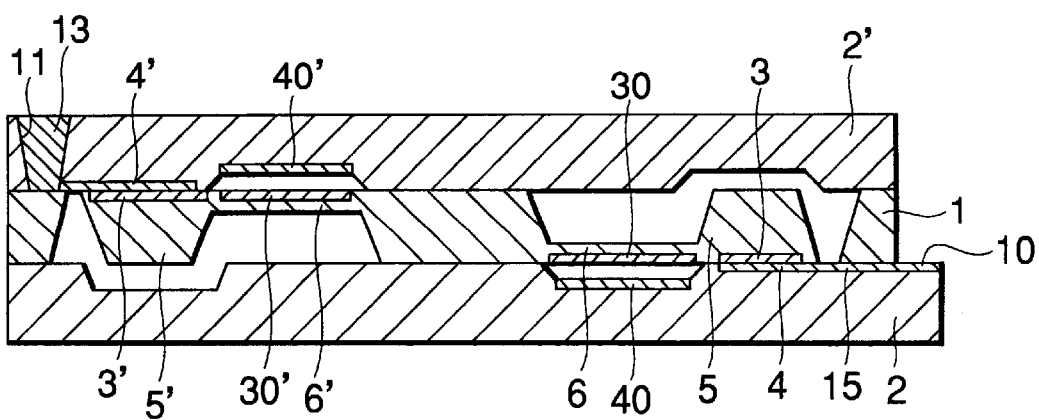
FIG. 8 is a sectional view to show another embodiment of an acceleration sensor according to the invention (two-direction detection)

FIG. 8 shows another embodiment of the invention. The embodiment is an example wherein both upward acceleration and downward acceleration shown in FIG. 8 can be sensed. In the figure, two heavy weights 5 and 5', two cantilevers 6 and 6', two moving electrodes 3 and 3', and two electrostatic attraction electrodes 30 and 30' are provided on a substrate 1.

Further, fixed electrode side substrates 2 and 2' are laminated on the top and bottom of the moving electrode side substrate 1, forming two acceleration sensors vertically symmetrical with each other.

The lower fixed electrode side substrate 2 is formed with a fixed electrode 4 at a position opposed to the moving electrode 3, an electrostatic attraction electrode 40 at a position opposed to the electrostatic attraction electrode 30 on the moving electrode side, a lead 15, and a bonding pad 10.

The upper fixed electrode side substrate 2' is formed with a fixed electrode 4' at a position opposed to the moving electrode 3', an electrostatic attraction electrode 40' at a position opposed to the electrostatic attraction electrode 30' on the moving electrode side, a lead 15', and a veer hole 11.

As seen in FIG. 8, if the acceleration acts in opposite directions of the top and bottom in the figure, the two acceleration sensors can detect the acceleration in their respective directions.

Therefore, it is made possible to detect acceleration in the two opposite directions by a pair of acceleration sensors.

Figure 9:
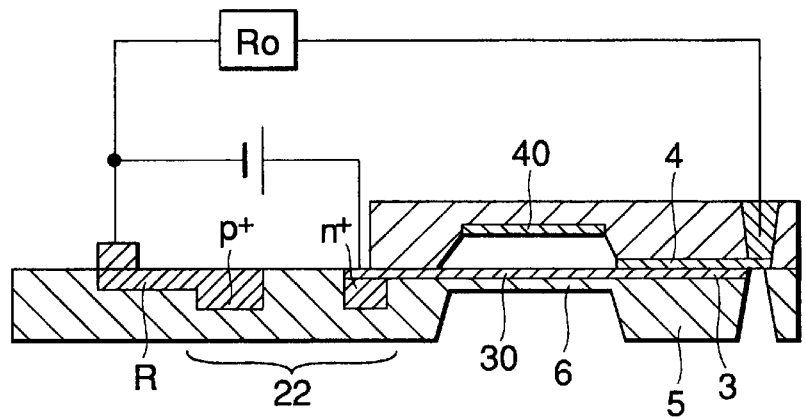
FIG. 9 is a sectional view to show another embodiment of an acceleration sensor according to the invention (building in Zener diode)
Figure 10:
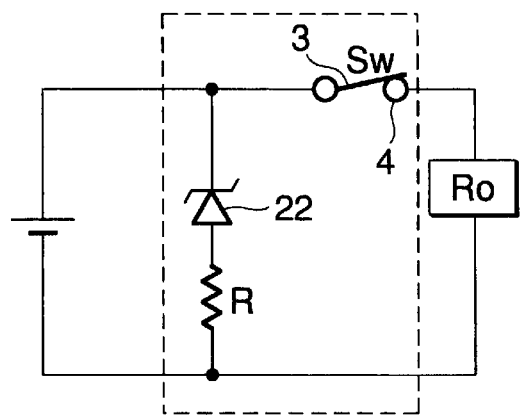
FIG. 10 is a circuit diagram of an equivalent circuit of an acceleration detector using the acceleration sensor shown in FIG. 9.

FIGS. 9 and 10 show a still another embodiment of the invention. FIG. 9 is a sectional view to show the structure of an acceleration sensor with a Zener diode 22 for damping surge current built in a silicon substrate 1. FIG. 10 shows an equivalent circuit to the acceleration sensor in FIG. 9.

The configuration of the acceleration sensor at the right of FIG. 9 is as previously described in the first embodiment. As shown at the left of the figure, the Zener diode 22 and a resistor R are built in the silicon substrate 1 and are connected to an external load circuit $R_0$, forming the equivalent circuit shown in FIG. 10.

As known, when the switching operation of the acceleration sensor is performed for the load $R_0$, the equivalent circuit prevents an overcurrent from flowing into a circuit directly passing through the electrode and the sensor electrode from being fixedly secured or burnt.

The fact that the substrate forming the sensor is made of a silicon semiconductor can be used to build in the elements at the same time as the sensor main body.

Resultantly, the range surrounded by the broken line in FIG. 10 is manufactured as the acceleration sensor in one piece and not only the acceleration sensor unit, but also the whole acceleration detector to which the sensor is applied can be miniaturized and simplified.

Figure 11:
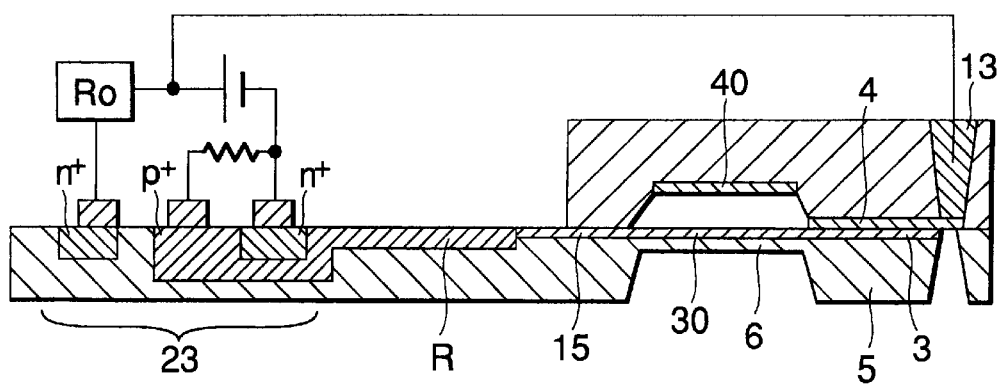
FIG. 11 is a sectional view to show another embodiment of an acceleration sensor according to the invention (building in transistor)
Figure 12:
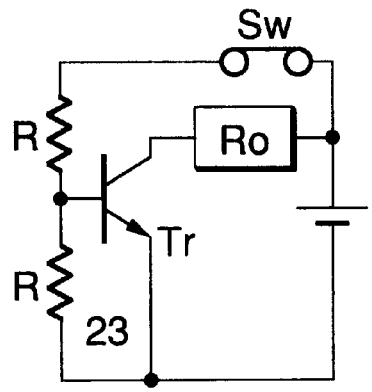
FIG. 12 is a circuit diagram of an acceleration detector equivalent circuit using the acceleration sensor shown in FIG. 11 (off circuit)
Figure 13:
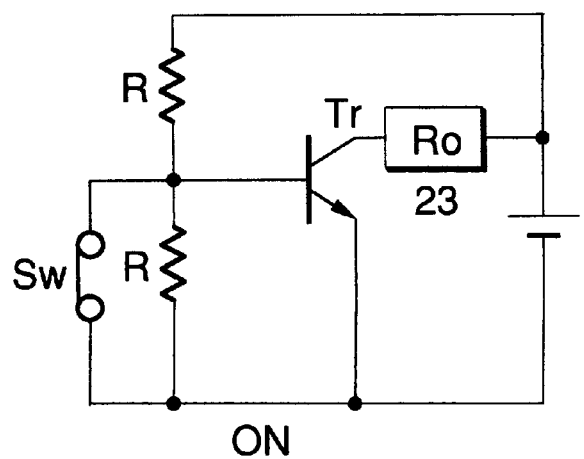
FIG. 13 is a circuit diagram of an acceleration detector equivalent circuit using the acceleration sensor shown in FIG. 11 (on circuit).

FIGS. 11—13 show a still another embodiment of the invention. FIG. 11 is a sectional view to show the structure of an acceleration sensor with a load drive transistor 23 (Tr) built in a silicon substrate 1. FIGS. 12 and 13 show equivalent circuits to the acceleration sensor in FIG. 11.

The structure of the sensor portion at the right of FIG. 11 is as previously described. The transistor Tr is built in the silicon substrate at the left of the figure so that a moving electrode of the sensor is connected to a base of the transistor Tr. To use the sensor, the elements are connected to an external load circuit $R_0$, forming the equivalent circuit shown in FIG. 12.

As known, the equivalent circuit to the acceleration sensor performs only the switching operation of the transistor Tr for preventing an overcurrent from flowing into an electrode of the acceleration sensor and damage to the electrode.

The equivalent circuit in FIG. 12 is used as an off circuit and that in FIG. 13 is used as on circuit.

Thus, the elements and the sensor making up the detection circuit are integrated into the substrate, whereby the whole acceleration detector is miniaturized and the acceleration detector can be improved in productivity and can be easily handled on practical use.

Thus, the fact that a silicon semiconductor substrate is used as the substrate formed with the electrodes is used to build the elements required on the configuration of the acceleration sensor or the circuit configuration as detection means in the substrate, whereby the acceleration sensor according to the invention can be furthermore miniaturized for handy use and a decrease in costs.

In the embodiments, the elements are formed in the substrate 1 on the moving electrode side, but can be built in the substrate 2 on the fixed electrode side on the structure, needless to say.

As we have discussed, according to the invention, in the semiconductor acceleration sensor, occurrence of chattering of an output waveform of a detection signal is prevented and acceleration can be detected accurately and stably. The detection sensitivity can be adjusted in response to detected acceleration and one sensor can detect acceleration in two opposite directions. Further, necessary elements on the configuration of an acceleration sensor are built in a semiconductor substrate, whereby further miniaturization, mass productivity improvement, cost reduction, and simplification of the sensor (detector) are enabled.

What is claimed is:

1. A semiconductor acceleration sensor comprising:
   a first semiconductor substrate superposed with a second semiconductor substrate, the second substrate formed with a cantilever connected to an inertial weight;
   a moving electrode provided on the inertial weight, at a position opposed to a fixed electrode on the first substrate; and
   a first electrostatic attraction electrode formed on the cantilever at a position opposed to a second electrostatic attraction electrode formed on the first substrate; wherein
   the first and second electrostatic attraction electrodes are maintained at a predetermined spacing by an attraction force caused by a predetermined voltage applied therebetween, and the moving electrode is in contact with the fixed electrode when an acceleration force acting on the acceleration sensor is less than a predetermined magnitude.

2. The semiconductor acceleration sensor according to claim 1, wherein the moving electrode breaks electrical contact with the fixed electrode when the acceleration force acting on the acceleration sensor is greater than a predetermined magnitude.

3. The semiconductor acceleration sensor according to claim 2, wherein the predetermined voltage applied between the first and second electrostatic attraction electrodes is adjustable for adjusting the sensitivity of the sensor.

4. The semiconductor acceleration sensor according to claim 2, wherein contact between the moving electrode and fixed electrode remains broken for at least a predetermined period of time after the occurrence of the acceleration force greater than the predetermined magnitude to prevent chattering.

5. The semiconductor acceleration sensor according to claim 1 further comprising a semiconductor element connected to either of the moving electrode and the fixed electrode and is formed in the substrate with the moving electrode or the fixed electrode.

6. The semiconductor acceleration sensor according to claim 5 wherein the semiconductor element is a Zener diode for damping surge current.

7. The semiconductor acceleration sensor according to claim 5 wherein the semiconductor element is a load drive transistor.

8. The semiconductor acceleration sensor according to claim 1 wherein gaps between the first and second substrates at the inertial weight, the cantilever, and the first electrostatic attraction electrode and the second electrostatic attraction electrode are provided by a photo-etching process.

9. The semiconductor acceleration sensor according to claim 1 wherein the fixed electrodes, the moving electrodes and the electrostatic attraction electrodes are provided by doping portions of the first and second substrates with impurities or by evaporating a conductive metal such as gold or aluminum.

10. A semiconductor acceleration sensor comprising:
    a moving electrode semiconductor substrate positioned between a first fixed electrode semiconductor substrate and a second fixed electrode semiconductor substrate, the moving electrode semiconductor substrate formed with a first cantilever connected to a first inertial weight on a first side, and a second cantilever connected to a second inertial weight on a second side;
    a first moving electrode provided on the first inertial weight, at a position opposed to a first fixed electrode on the first fixed electrode semiconductor substrate; and
    a second moving electrode provided on the second inertial weight, at a position opposed to a second fixed electrode on the second fixed electrode semiconductor substrate;
    a first electrostatic attraction moving electrode formed on the first cantilever at a position opposed to a first electrostatic fixed attraction electrode formed on the first fixed electrode semiconductor substrate; and
    a second electrostatic attraction moving electrode formed on the second cantilever at a position opposed to a second electrostatic fixed attraction electrode formed on the second fixed electrode semiconductor substrate; wherein
        the electrostatic attraction electrodes are maintained at predetermined spacings from attraction forces caused by predetermined voltages applied therebetween, and the first and second moving electrodes are in contact with the first and second fixed electrodes when a first acceleration force and a second acceleration force acting on the acceleration sensor are each less than a predetermined magnitude.

11. The semiconductor acceleration sensor according to claim 10, wherein the first moving electrode breaks contact with the first fixed electrode when the first acceleration force acting on the acceleration sensor is greater than a predetermined magnitude.

12. The semiconductor acceleration sensor according to claim 11, wherein contact between the first moving electrode and the first fixed electrode remains broken for at least a predetermined period of time after the occurrence of the first acceleration force greater than the predetermined magnitude to prevent chattering.

13. The semiconductor acceleration sensor according to claim 10, wherein the second moving electrode breaks contact with the second fixed electrode when the second acceleration force acting on the acceleration sensor is greater than a predetermined magnitude.

14. The semiconductor acceleration sensor according to claim 13, wherein contact between the second moving electrode and the second fixed electrode remains broken for at least a predetermined period of time after the occurrence of the second acceleration force greater than the predetermined magnitude to prevent chattering.

15. The semiconductor acceleration sensor according to claim 10, wherein the predetermined voltages applied between the electrostatic attraction electrodes are adjustable for adjusting the sensitivity of the sensor.

16. The semiconductor acceleration sensor according to claim 10 wherein gaps between the substrates at the first and second inertial weights, the first and second cantilevers, the first and second electrostatic attraction fixed electrodes and the first and second electrostatic attraction moving electrodes, are provided by a photo-etching process.

17. The semiconductor acceleration sensor according to claim 10 wherein the fixed electrodes, the moving electrodes and the electrostatic attraction electrodes are provided by doping with impurities or by evaporating a conductive metal such as gold or aluminum.

18. The semiconductor acceleration sensor according to claim 10, further comprising at least one semiconductor element connected to either of the first and second moving electrodes and the first and second fixed electrodes and is formed in the substrate with the moving electrode or the fixed electrode.

19. The semiconductor acceleration sensor according to claim 18 wherein the at least one semiconductor element is a Zener diode for damping surge current.

20. The semiconductor acceleration sensor according to claim 18 wherein the at least one semiconductor element is a load drive transistor.

* * * * *